US012099138B1

(12) United States Patent
West

(10) Patent No.: US 12,099,138 B1
(45) Date of Patent: Sep. 24, 2024

(54) MANEUVERABLE JAMMING GRID ARRAY AND METHODS OF USE THEREOF

(71) Applicant: Brandon West, Roswell, GA (US)

(72) Inventor: Brandon West, Roswell, GA (US)

( * ) Notice: Subject to any disclaimer, the term of this patent is extended or adjusted under 35 U.S.C. 154(b) by 59 days.

(21) Appl. No.: 18/060,325

(22) Filed: Nov. 30, 2022

Related U.S. Application Data

(60) Provisional application No. 63/355,338, filed on Jun. 24, 2022.

(51) Int. Cl.
*G01S 7/38* (2006.01)
*H04K 3/00* (2006.01)

(52) U.S. Cl.
CPC . *G01S 7/38* (2013.01); *H04K 3/00* (2013.01)

(58) Field of Classification Search
None
See application file for complete search history.

(56) References Cited

U.S. PATENT DOCUMENTS

| 10,002,561 | B1* | 6/2018 | Tridico | G09G 3/003 |
| 2011/0187576 | A1* | 8/2011 | Salewski | H01Q 21/28 342/14 |
| 2016/0155576 | A1* | 6/2016 | Frank | H01G 4/30 29/25.03 |
| 2018/0072414 | A1* | 3/2018 | Cantrell | B64C 3/56 |
| 2018/0341262 | A1* | 11/2018 | Yeshurun | F41H 13/005 |
| 2020/0062392 | A1* | 2/2020 | Yoon | B64U 10/60 |
| 2020/0277069 | A1* | 9/2020 | Rainville | B64U 20/75 |
| 2021/0351844 | A1* | 11/2021 | Iranzad | H04B 10/1125 |

* cited by examiner

*Primary Examiner* — Ladimir Magloire
*Assistant Examiner* — David C. Schultz
(74) *Attorney, Agent, or Firm* — Mathew L. Grell, Esq.; Grell & Watson Patent Attorneys LLC

(57) ABSTRACT

A maneuverable jamming grid array and methods of use thereof, that generally a portable grid array having a plurality of power supplies and a plurality of charging capacitors, an array of optical/RF module emitters configured on the grid array, in electrical communication with the power supplies and the plurality of charging capacitors, a control and communications module in electrical communication with the array of optical/RF module emitters, at least one array lifting and maneuvering drone connected to the grid array; and at least one array lifting balloon connected to said grid array, and thus to facilitate a positionable antiaircraft defense system.

20 Claims, 4 Drawing Sheets

MANEUVERABLE JAMMING GRID ARRAY AND METHODS OF USE THEREOF

CROSS-REFERENCE TO RELATED APPLICATIONS

To the full extent permitted by law, the present United States Non-provisional Patent Application hereby claims priority to and the full benefit of United States Provisional Application entitled "COUNTER UAS/AIRCRAFT/MISSILE/SPACECRAFT GRID ARRAY," having assigned Ser. No. 63/355,338, filed on Jun. 24, 2022, incorporated herein by reference in its entirety.

FIELD OF THE DISCLOSURE

This disclosure relates to a military defense system to counter enemy unmanned aircraft systems, aircraft, missile, spacecraft, and the like. More specifically the disclosure relates to maneuverable jamming grid array to counter enemy aircraft.

BACKGROUND

The current state of the art in antiaircraft defense system designed to protect against aircraft attack include surface-to-air missile (SAM) category of weapons, also known as a ground-to-air missile (GTAM) or surface-to-air guided weapon (SAGW), is a missile system designed to be launched from the ground to destroy aircraft or other missiles. Moreover, the system is dependent on space-based satellites and ground- or sea-based radars together create a monitoring system that contribute to offensive missile detection. Ultimately, surface-to-air missile try to eliminate the threat by actually running into it, a very precise collision path which requires maneuverability as the incoming threat maneuvers to avoid contact.

At least one disadvantage or drawback to this approach is that ultimately, the surface-to-air missile try to eliminate the threat by actually running into it, a very precise collision path which requires maneuverability as the incoming threat maneuvers to avoid contact.

Therefore, it is readily apparent that there is a need for a maneuverable jamming grid array and methods of use thereof that functions to enable a combination of features that is designed to address at least some aspects of the problems discussed above.

SUMMARY

Briefly described, in an example embodiment, the present disclosure overcomes the above-mentioned disadvantages and meets the recognized need for a maneuverable jamming grid array and methods of use thereof, that generally a portable grid array having a plurality of power supplies and a plurality of charging capacitors, an array of optical/RF module emitters configured on the grid array, in electrical communication with the power supplies and the plurality of charging capacitors, a control and communications module in electrical communication with the array of optical/RF module emitters, at least one array lifting and maneuvering drone connected to the grid array; and at least one array lifting balloon connected to said grid array, and thus to facilitate a position able an antiaircraft defense system.

In an exemplary embodiment of a maneuverable defense system to create a localized signal defeating or aircraft defeating zone, including a grid array having a plurality of array power sources in electrical communication with a plurality of charging capacitors, the array power sources and the plurality of charging capacitors affixed to the grid array, a plurality of energy emitter modules in electrical communication with the plurality of charging capacitors, and the plurality of energy emitter modules affixed to the grid array, an array command and control module in electrical communication with the plurality of energy emitter modules, the array command and control module to coordinate and control firing of the plurality of energy emitter modules, one or more drone apparatus affixed to the grid array, the one or more drone apparatus utilized to maneuver the grid array, and one or more lifting balloons affixed to the grid array, the one or more lifting balloons utilized to maneuver the grid array and to counter a weight of the grid array.

In an exemplary embodiment of a maneuverable defense system to create a localized signal defeating or aircraft defeating zone, including a grid array having a plurality of array power sources in electrical communication with a plurality of charging capacitors, the array power sources and the plurality of charging capacitors affixed to the grid array, a plurality of energy emitter modules in electrical communication with the plurality of charging capacitors, and the plurality of energy emitter modules affixed to the grid array, an array command and control module in electrical communication with the plurality of energy emitter modules, the array command and control module to coordinate and control firing of the plurality of energy emitter modules, and one or more micro thrusters affixed to the grid array, the one or more micro thrusters utilized to maneuver the grid array.

A feature of the present disclosure may include is the ability to create a maneuverable defense system to create a localized signal defeating or aircraft defeating zone.

A feature of the present disclosure may include is the ability to utilize at least one array lifting and maneuvering drone, such as a quad type copter connected to the grid array or any other version that can actively move the grid array into position, to position the array in any linear, vertical, or horizontal plane for maximum operational accuracy, in atmosphere applications.

A feature of the present disclosure may include the ability to utilize at least one array lifting balloon, such as a helium balloon connected to the grid array or any other version that can actively hold the grid array in position.

A feature of the present disclosure may include the ability to utilize at least one array lifting and maneuvering micro thruster connected to the grid array or any other version that can actively move the grid array into position, to position the array in any linear, vertical, or horizontal plane for maximum operational accuracy, in upper atmosphere applications, such as troposphere, stratosphere, mesosphere, thermosphere, ionosphere, and exosphere.

A feature of the present disclosure may include the ability to package and wrap the system in a deployable unit from a rocket or missile warhead bodies originating launched from submarine, aircraft, space bound launchers or as a sled from a C-130, C-17, or other transport.

A feature of the present disclosure may include the ability to utilize support balloons to lift, keep aloft, or reduce payload of maneuverable jamming grid array.

A feature of the present disclosure may include the ability to utilize RF or optical pulsed beams, IR generators, signal jamming techniques, electrical and electronic destruction techniques to combat enemy systems.

These and other features of the maneuverable jamming grid array and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1A:
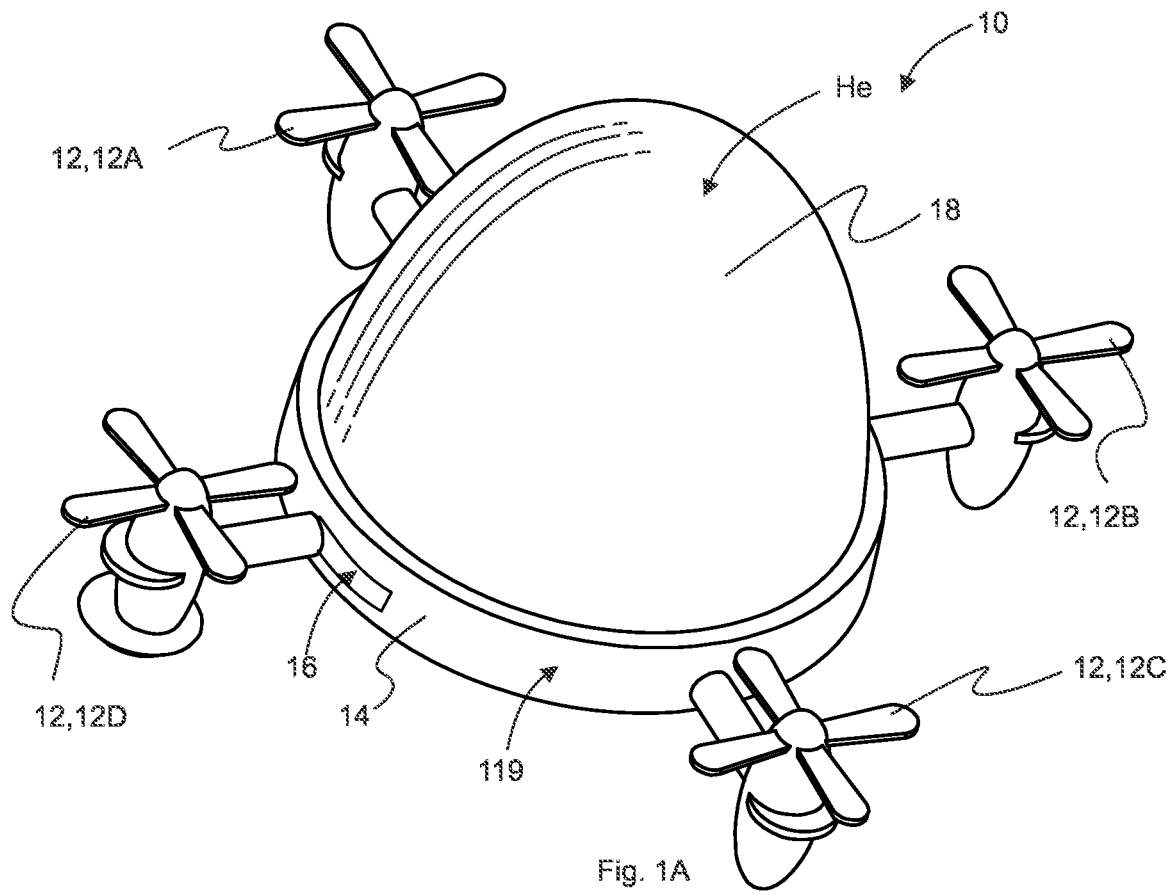
FIG. 1A is a perspective view of quad type copter drone apparatus according to select embodiments of the instant disclosure.
Figure 1B:
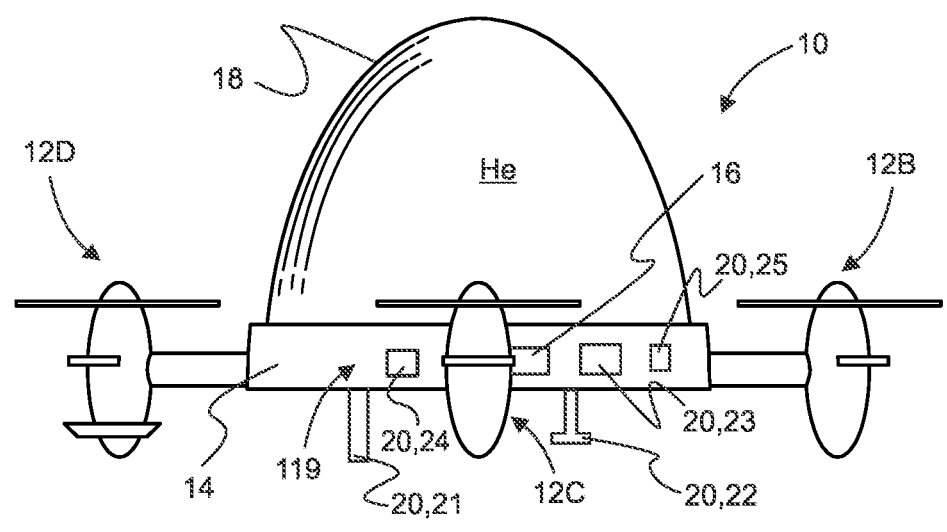
FIG. 1B is a front view of quad type copter drone apparatus according to select embodiments of the instant disclosure.

Referring now to FIGS. 1A and 1B, by way of example, and not limitation, there is illustrated a quad type copter drone apparatus 10. Drone 10 may be utilized to lift, keep aloft, or move maneuverable jamming grid array 100 into position. Drone 10 may include one or more or a set of copter assemblies 12 capable of lift, keep aloft, or movement in any linear, vertical, or horizontal plane for maximum operational accuracy, and more specifically quad type copter assemblies 12, such as first copter assembly 12A, second copter assembly 12B, third copter assembly 12C, and fourth copter assembly 12D. It is contemplated herein that any deployable drone 10 may be utilized to lift, keep aloft, or move maneuverable jamming grid array 100 into position. Moreover, set of copter assemblies 12 may be retractable or have retractable blade that are retracted into drone body (such as retraction slot(s) 16), housing, or structure 14 or tucked up against structure 14, so as to enable a tight, reduced size drone 10 assembly to package and wrap the system in a deployable unit from a rocket or missile warhead bodies originating launched from submarine, aircraft, space bound launchers or as a sled from a C-130, C-17, or other transport. Furthermore, drone 10 may include a gas chamber, such as chamber 18 affixed to and positioned proximate structure 14. Chamber 18 may be utilized to house or contain a lighter or less dense gas, such as helium He to counter the weight of drone 10, to lift and keep aloft drone 10, and/or to lift and keep aloft maneuverable jamming grid array 100. Furthermore, drone 10 may utilize subsystems 20 to perform various functions such as control, communications, energy or power transfer, camera, sensors and the like. One embodiment of subsystems 20 may include a signal antenna, such as communications antenna 21 configured to transmit and receive inputs via an RF signal to, for example, communicate location or positioning of maneuverable jamming grid array 100 and/or drone 10 and respond to commands to re-locate same, control operation of maneuverable jamming grid array 100 systems. Another embodiment of subsystems 20 may include drone power receiver/transmitter, such as drone power transmit antenna 22 to transmit or receive power to maneuverable jamming grid array 100 systems. Another embodiment of subsystems 20 may include drone positioning system(s) 25, such as global positioning system (GPS) to receive, calculate, and determine drone 10 location or position of maneuverable jamming grid array 100 systems. Another embodiment of subsystems 20 may include audio, visual system, such as camera system 25. Another embodiment of subsystems 20 may include drone command and control module 24 to communicate with or control other subsystems 20. Another embodiment of subsystems 20 may include power source 19, such as extended range re-chargeable battery 19 to power drone 10, subsystems 20, and or maneuverable jamming grid array 100 systems.

It is contemplated herein that drone 10 may include other subsystems known by one of ordinary skill in the art.

It is contemplated once drone 10 may be deployed via a deployment system, for example, once the missile/rocket reach target location and altitude, with retracted copter assemblies 12, communication with command and control module 24 may activate deployment of copter assemblies 12 blades pop out, deploy, and spin up to support, position, and steady maneuverable jamming grid array 100.

It is contemplated herein that drone 10 may include at least one array lifting and maneuvering drone, such as a quad type copter connected to the grid array or any other version that can actively move the grid array into position, to position the array in any linear, vertical, or horizontal plane for maximum operational accuracy, in atmosphere applications.

It is contemplated herein that drone 10 may include at least one or one or more array lifting and maneuvering micro thruster connected to the grid array or any other version that can actively move the grid array into position, to position the array in any linear, vertical, or horizontal plane for maximum operational accuracy, in upper atmosphere applications, such as troposphere, stratosphere, mesosphere, thermosphere, ionosphere, and exosphere.

It is contemplated herein that drone 10 may include the ability to fold, collapse, package, and wrap the system in a deployable unit from a rocket or missile warhead bodies originating launch from submarine, aircraft, space bound launchers or as a sled from a C-130, C-17, or other transport.

It is contemplated herein that various transport means may be utilized to transport maneuverable jamming grid array 100 systems to target or deployment zone.

It is contemplated herein that various transport means may be utilized to transport or maintain coordinates of maneuverable jamming grid array 100 systems locally around deployment zone.

Figure 2A:
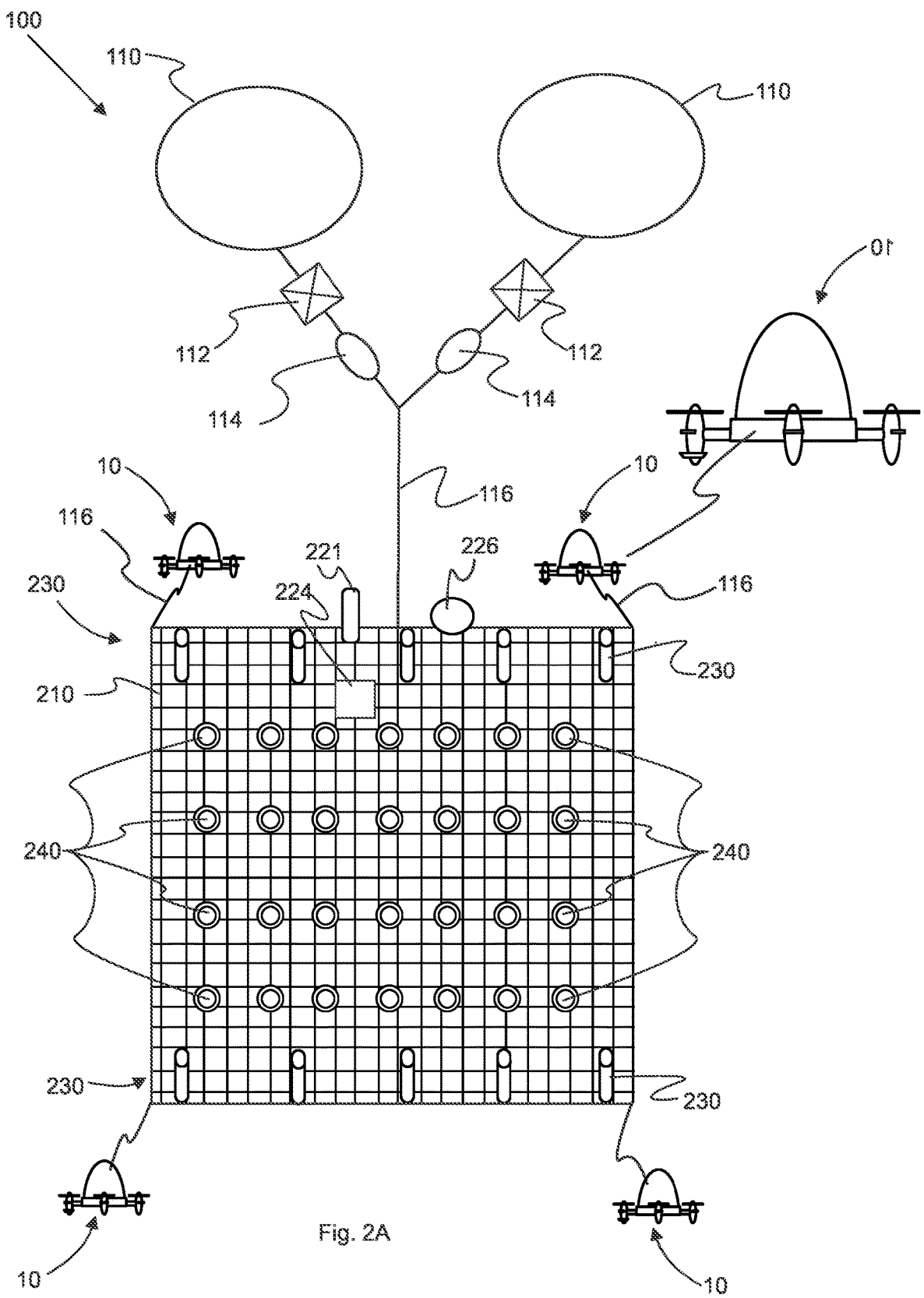
FIG. 2A is a back view of maneuverable jamming grid array according to select embodiments of the instant disclosure.
Figure 2B:
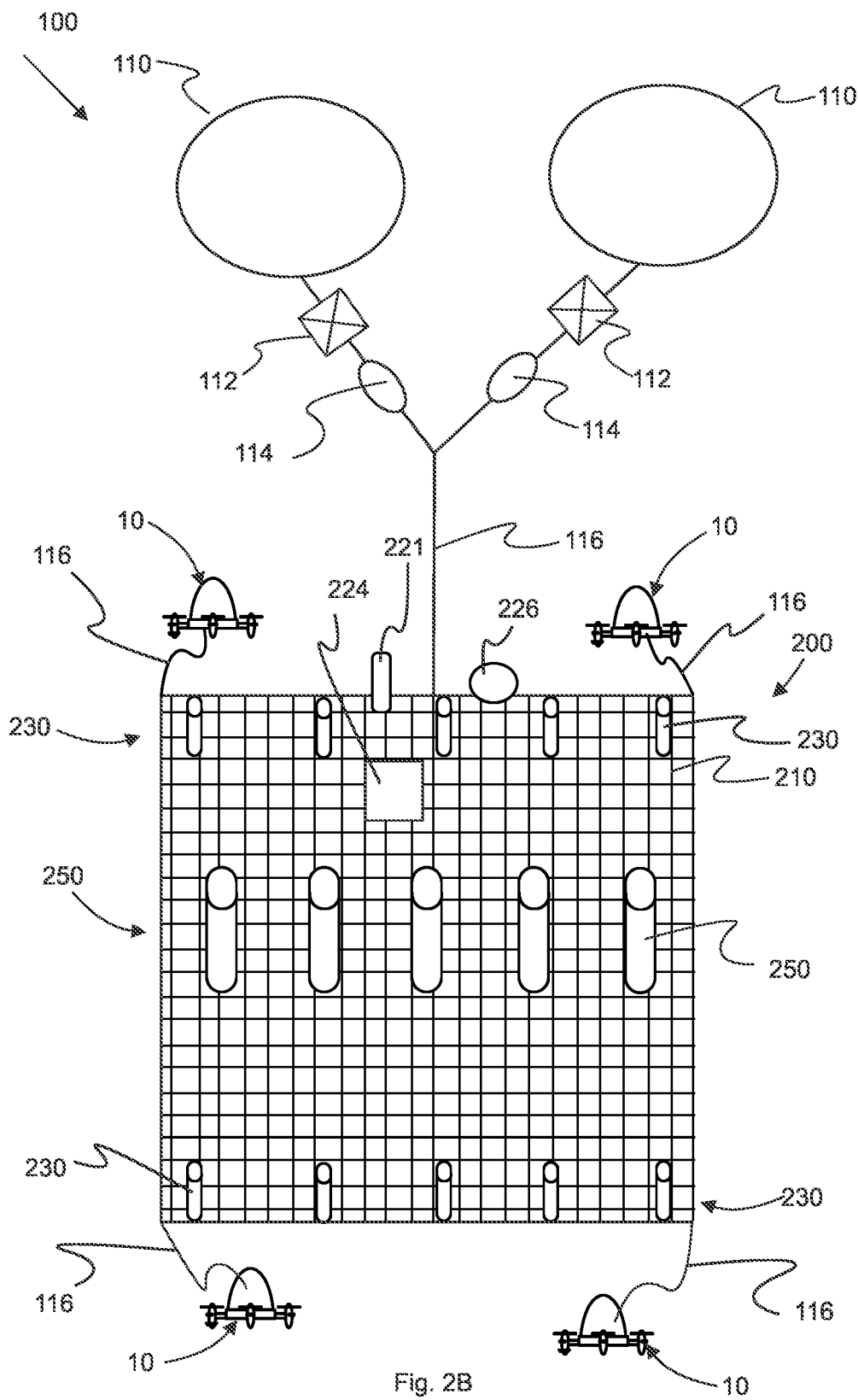
FIG. 2B is a front view of maneuverable jamming grid array according to select embodiments of the instant disclosure.

Referring to FIGS. 2A and 2B, by way of example, and not limitation, there is illustrated an example embodiment of maneuverable jamming grid array 100. Maneuverable jamming grid array 100 may include one or more support balloons, such as lifting balloons 110 tethered or connected to grid array 200 via straps 116. Lifting balloons 110 may be utilized to lift, keep aloft, or move ("maneuver") grid array 200 into position and to counter the weight of grid array 200 and/or to lift and keep aloft grid array 200. Moreover, maneuverable jamming grid array 100 may include tanks, such as containers 114 filled with a lighter or less dense gas, such as helium He. Containers 114 may be pipe or tube connected to lifting balloons 110 and discharge gas into lifting balloons 110 via valves 112 in communication with command and control module 24 to counter the weight of grid array 200 and/or to lift and keep aloft grid array 200.

It is contemplated once lifting balloons 110 is deployed, for example, once the missile/rocket reach target location/altitude, with bundled lifting balloons 110 and containers 114, communication with command and control module 24 may activate deployment of lifting balloons 110 and containers 114, open valves 112, inflate lifting balloons 110 with helium He or other discharge gas to support, position, and steady grid array 200.

Moreover, maneuverable jamming grid array 100 may include grid array 200. Grid array 200 may include interlaced or grid support structure 210 preferably constructed of Tevlar, Teflon, or other non-conductive webbing material with very light weight and high tensile/shearing strength properties. Alternatively, grid array 200 may include grid support structure 210 constructed of Nano metallic type material that may be utilized to harness and extract static electric power from the atmosphere to charge grid array 200 power supplies.

Grid array 200 may be constructed of other similar high tensile or strengthened and lightweight materials, as these material offers a variety of forms and shapes and provide strength with reduced weight; however, other suitable materials or the like, can be utilized, provided such material has sufficient strength and/or durability as would meet the purpose described herein.

Furthermore, a plurality of drone 10 positioned about perimeter 211 tethered or connected to grid array 200 via straps 116 to lift, keep aloft, and move grid array 200. Array command and control module 224 receives input information via array communications antenna 221, and then sends commands to communications antenna 21 to drones 10, to reposition, hover lift, keep aloft, or movement in any linear, vertical, or horizontal plane for maximum operational accuracy therewith affixed grid array 200.

Still furthermore, one or more or plurality of array power sources, such as array battery (batteries) 230 may be positioned about and affixed thereto grid array 200 to power grid array 200 and its contents or subsystems. It is contemplated herein that array battery 230 may include lithium rechargeable battery. It is further contemplated herein grid array 200 may include grid support structure 210 constructed of Nano metallic type material that may be utilized to harness and extract static electric power from the atmosphere to charge array battery 230.

Still furthermore, one or more capacitor, such as plurality of array capacitor (capacitors) 240 may be positioned about and affixed thereto grid array 200 to store pulse power for grid array 200 and its contents or subsystems. Moreover, plurality of array capacitor (capacitors) 240 may be trickle charged via an electrical connection run between array capacitor (capacitors) 240 and array battery (batteries) 230. It is contemplated that electrical connections may be affixed to grid array 200.

Still furthermore, one or more or a plurality of energy emitter modules 250, such as plurality of array optical/RF modules 250 may be positioned about and affixed thereto grid array 200 to create or generate a high power or energy optical or RF beam, or a combination of both. It is contemplated herein that one or more of plurality of array capacitor (capacitors) 240 will release their charge resulting in the firing, frequency type, fire pulsing selection of energy emitter modules 250. It is further contemplated herein that array command and control module 224 signals or controls release of stored energy therein one or more of plurality of array capacitor (capacitors) 240 to power one or more of plurality of energy emitter modules 250 to generate or create a high power or energy, such as optical or RF beam, or a combination of both emanating from grid array 200.

It is still further contemplated herein that one or more of plurality of energy emitter modules 250 may include focal point adjusting lens 259 to focus high power or energy, such as optical or RF beam, or a combination of both emanating from grid array 200, dependent on the target and target distance.

It is still further contemplated herein that grid array 200 may include array power receiver device, such as power antenna 226 that may be utilized to re-charge array battery 230 via remote energy or power solutions such a direct microwave charging, wireless charging, and any other power beaming technology, and alternatively extended range re-chargeable battery 19 of power drone 10 may be utilized to charge power antenna 226 that may be utilized to re-charge array battery 230 while hover close to power antenna 226.

It is still further contemplated herein that array battery 230 may be utilized to charge re-chargeable battery 19 of power drone 10 via power antenna 226.

It is still further contemplated herein that array battery 230 and/or re-chargeable battery 19 of power drone 10 via power antenna 226 charged via grid support structure 210 constructed of Nano metallic type material that may be utilized to harness and extract static electric power from the atmosphere.

It is still further contemplated herein that grid array 200 may incorporate other offensive systems, such as an IR generator, visual impairment device, or other custom generating device. Grid array 200 can be moved into other locations or re-positioned, or grouped close together by one or more drone 10 tethered to grid array 200 with multiples of maneuverable jamming grid array 100 to create a much larger array, blocking entrance and creating a localized ("Force Field) and/or signal defeating zone, or destructive RF/optical pulsing device/system or zone.

It is still further contemplated herein that grid array 200 may be utilized to directly "interdict" a missile, aircraft, drone, spacecraft by interacting with the forward section of the enemy object (or any other surface), and by grid array 200 releasing the entire capacitor power, in a self-destructive mode, releasing all of the associated power and RF/optical energy, causing catastrophic electronic damage to enemy object. Moreover, other payloads can also be attached to grid array 200 that are more geared towards a specific purpose, to include GPS jamming, communications jamming, signal jamming, and other forms of communications interference. Grid array 200 can also be constructed of a conductive NANO material to facilitate a localized destructive electrical "frying" of the enemy/nefarious activity device or enemy object.

It is still further contemplated herein that grid array 200 may be outfitted with standard RF antenna's such as a YAGI.

It is still further contemplated herein that grid array 200 may utilize support balloons, lifting balloons 110 to lift, keep aloft, or reduce payload of maneuverable jamming grid array 100.

It is still further contemplated herein that grid array 200 may incorporate RF or optical pulsed beams, IR generators, signal jamming techniques, electrical and electronic destruction techniques to combat enemy systems.

It is still further contemplated herein that grid array 200 may utilize command and control module 224 to coordinate and control firing, frequency type, fire pulsing selection of array optical/RF modules 250, and controlling power antenna 226, communications antenna 221, array battery 230, drones 10, valves 112 and the like.

It is still further contemplated herein that grid array 200 may be powered by array battery 230, and plurality of energy emitter modules 250 may be powered by plurality of array capacitor 240, pulsing off and on.

It is still further contemplated herein that maneuverable jamming grid array 100 may be utilized to create as a maneuverable defense system to create a localized signal defeating or destructive zone.

Figure 3A:
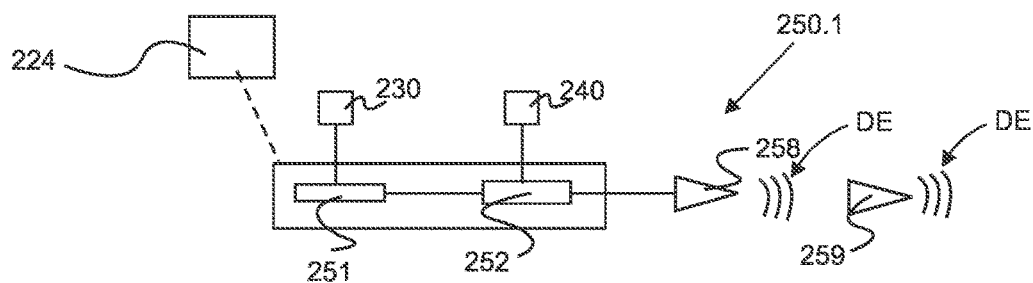
FIG. 3A is a diagram of a power emitter module being a RF module according to select embodiments of the instant disclosure.

Referring to FIG. 3A, by way of example, and not limitation, there is illustrated an example embodiment of power emitter module being RF module 250.1. RF module 250.1 may utilize command and control module 224 to coordinate and control firing, frequency type, fire pulsing selection of RF modules 250.1. RF modules 250.1 may include RF source module 251 (powered from array battery 230), and RF amplifier 252 (powered by pulsed power from array capacitor 240), causing or to generate high powered pulsed RF energy beams, with the selected RF frequency to emanate from emitter antenna 258 via commands command and control module 224 and communications antenna 221, pulsing destructive energy DE towards enemy drones and aircraft. In addition, RF module 250.1 may utilize emitter point/focus adjuster, such as emitter lens 259 that can focus in and out, based on the distance to direct or focus destructive energy DE towards enemy drones and aircraft. Enemy drones and aircraft location being determined by GPS, radar, laser, or other forward detection system from tracking sources in the air, water, and on the ground may be utilized by command and control module 224 to regulate RF modules 250.1 causing high pulsed RF beam, with the selected RF frequency to produce destructive energy DE directed towards enemy drones and aircraft. It is contemplated herein that RF pulsed beam may be used to disable, disrupt, deter, and destroy the drone or aircraft, via jamming or other destructive signals generated.

Figure 3B:
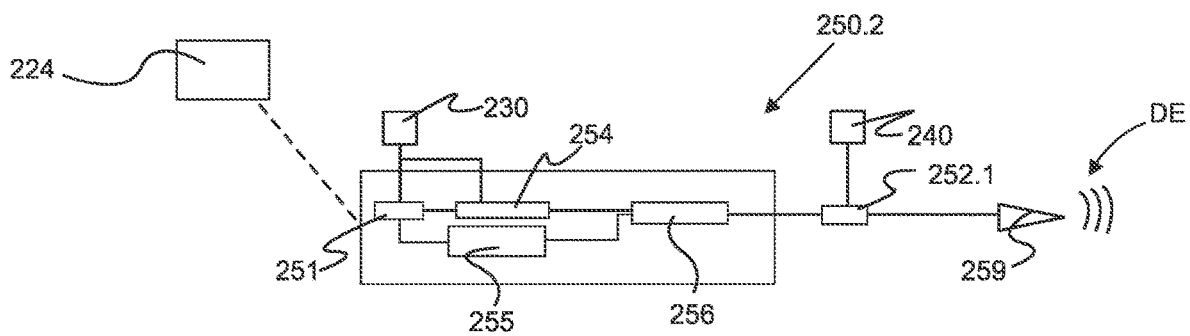
FIG. 3B is a is a diagram of an alternate embodiment power emitter module being an optical/RF module according to select embodiments of the instant disclosure.

Referring to FIG. 3B, by way of example, and not limitation, there is illustrated an example embodiment of power emitter module being RF/Optical module 250.2. RF/Optical module 250.2 may utilize command and control module 224 to coordinate and control firing, frequency type, fire pulsing selection of RF/Optical modules 250.2. RF/Optical modules 250.2 may include RF source module 251 and laser source module 255 (powered from array battery 230), and RF amplifier 252 and optical amplifier 252.1 (powered by pulsed power from array capacitor 240), causing high powered pulsed RF/Optical beams power, with the selected RF/Optical frequency to emanate from emitter point 258 via commands command and control module 224 and communications antenna 221, pulsing destructive energy DE towards enemy drones and aircraft. The two sources (RF/Optical) are combined after the RF is converted to an optical signal via RF to fiber converter 254, then both signals are sent through optical coupler 256, and then both signals are sent through optical amplifier 252.1. In addition, RF module 250.1 may utilize emitter point/focus adjuster, such as emitter lens 259 that can focus in and out, based on the distance to direct or focus destructive energy DE towards enemy drones and aircraft. Enemy drones and aircraft location being determined by GPS, radar, laser, or other forward detection system from tracking sources in the air, water, and on the ground may be utilized by command and control module 224 to regulate RF/Optical module 250.2 causing high pulsed RF/Optical beam, with the selected RF/Optical frequency to produce destructive energy DE directed towards enemy drones and aircraft. It is contemplated herein that RF/Optical pulsed beam may be used to disable, disrupt, deter, and destroy the drone or aircraft, via jamming or other destructive signals generated.

Figure 3C:
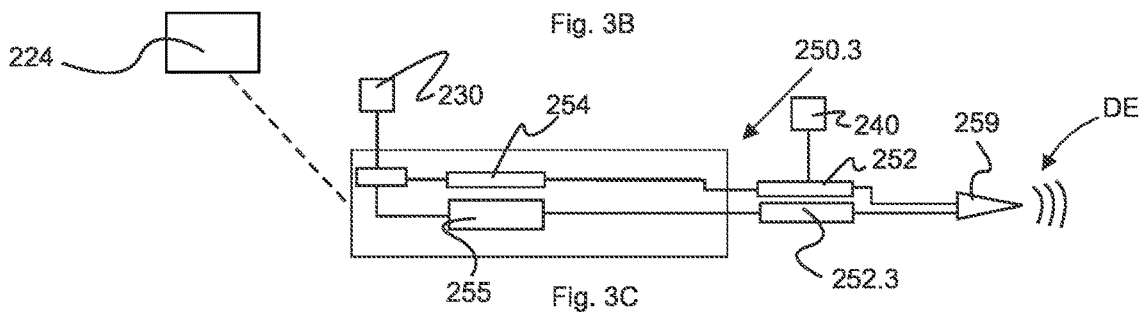
FIG. 3C is a is a diagram of an alternate embodiment power emitter module being an optical/RF module having a separate RF source and laser source according to select embodiments of the instant disclosure.

Referring to FIG. 3C, by way of example, and not limitation, there is illustrated an example embodiment of power emitter module being RF/optical module 250.3. RF module 250.3 may utilize command and control module 224 to coordinate and control firing, frequency type, fire pulsing selection of RF/optical modules 250.3. RF/optical modules 250.3 may include RF source 251 and laser source 255 (powered from array battery 230), and RF amplifier 252 and fiber amplifier 252.3 (powered by pulsed power from array capacitor 240), causing high powered pulsed RF/Optical beams power, with the selected RF/Optical frequency to emanate from emitter antenna 258 via commands command and control module 224 and communications antenna 221, pulsing destructive energy DE towards enemy drones and aircraft. In addition, RF/Optical module 250.3 may utilize emitter point/focus adjuster, such as emitter lens 259 that can focus in and out, based on the distance to direct or focus destructive energy DE towards enemy drones and aircraft. Enemy drones and aircraft location being determined by GPS, radar, laser, or other forward detection system from tracking sources in the air, water, and on the ground may be utilized by command and control module 224 to regulate RF/Optical modules 250.3 causing high pulsed RF/Optical beam, with the selected RF/Optical frequency to produce destructive energy DE directed towards enemy drones and aircraft. It is contemplated herein that RF/Optical pulsed beam may be used to disable, disrupt, deter, and destroy the drone or aircraft, via jamming or other destructive signals generated.

Figure 3D:
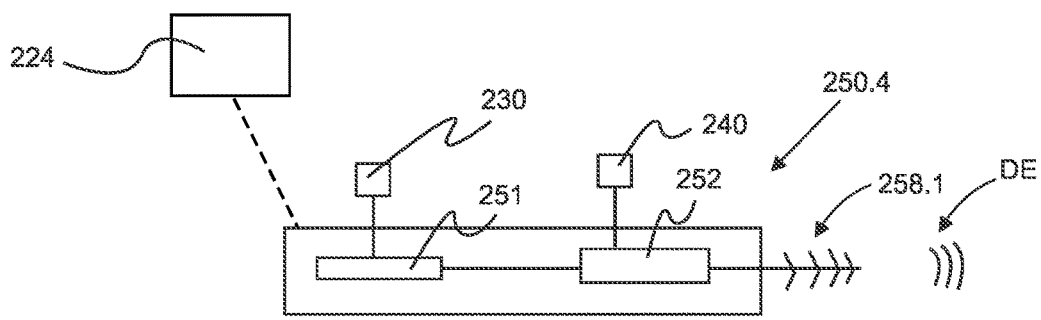
FIG. 3D is a is a diagram of an alternate embodiment power emitter module being an RF module having a separate RF source according to select embodiments of the instant disclosure.

Referring to FIG. 3D, by way of example, and not limitation, there is illustrated an example embodiment of power emitter module being RF module 250.1. RF module 250.1 may utilize command and control module 224 to coordinate and control firing, frequency type, fire pulsing selection of RF modules 250.1. RF modules 250.1 may include RF source 251 (powered from array battery 230), and RF amplifier 252 (powered by pulsed power from array capacitor 240), causing high powered pulsed RF beams, with the selected RF frequency to emanate from Yagi antenna 258.1 via commands command and control module 224 and communications antenna 221, pulsing destructive energy DE towards enemy drones and aircraft. In addition, RF module 250.1 may utilize emitter point/focus adjuster, such as emitter lens 259 that can focus in and out, based on the distance to direct or focus destructive energy DE towards enemy drones and aircraft. Enemy drones and aircraft location being determined by GPS, radar, laser, or other forward detection system from tracking sources in the air, water, and on the ground may be utilized by command and control module 224 to regulate RF modules 250.1 causing high pulsed RF beam, with the selected RF frequency to produce destructive energy DE directed towards enemy drones and aircraft. It is contemplated herein that RF pulsed beam may be used to disable, disrupt, deter, and destroy the drone or aircraft, via jamming or other destructive signals generated.

It is contemplated herein that RF/optical module 250 may include other destructive energy DE generating devices to use offensively or defensively used to disable, disrupt, deter, and destroy the drone or aircraft, via jamming or other destructive signals generated.

It is further understood herein that the parts and elements of this disclosure may be located or position elsewhere based on one of ordinary skill in the art without deviating from the present disclosure.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A maneuverable defense system to create a localized signal defeating or aircraft defeating zone deployable from a missile or aircraft at a target location/altitude, said system comprising:
- a deployable grid array having an interlaced web structure, said deployable grid array having a plurality of array power sources in electrical communication with a plurality of charging capacitors, said array power sources and said plurality of charging capacitors affixed to said grid array;
- a plurality of energy emitter modules in electrical communication with said plurality of charging capacitors, and said plurality of energy emitter modules affixed to said grid array;
- an array command and control module in electrical communication with said plurality of energy emitter modules, said array command and control module to coordinate and control firing of said plurality of energy emitter modules;
- one or more deployable drone apparatus affixed to said grid array, said one or more drone apparatus utilized to maneuver said grid array, said one or more deployable drone apparatus having one or more copter assemblies, said one or more copter assemblies being retractable into a retraction slot in a structure of said one or more drone apparatus, said one or more copter assemblies in communication with said array command and control module to deploy said one or more copter assemblies upon deployment; and
- one or more deployable lifting balloons affixed to said grid array, said one or more lifting balloons utilized to maneuver said grid array and to counter a weight of said grid array, said one or more deployable lifting balloons having a container connected thereto configured to discharge a gas into said one or more lifting balloons via a valve in communication with said array command and control module upon deployment.

2. The system of claim 1, wherein said grid array is constructed of non-conductive webbing material.

3. The system of claim 2, wherein said grid array is constructed of Nano metallic material to harness and extract static electric power from an atmosphere to charge said plurality of array power sources.

4. The system of claim 1, said array power sources and said plurality of charging capacitors positioned about said grid array.

5. The system of claim 1, further comprising a focal point adjusting lens to focus high power or energy emanating from each of said plurality of energy emitter modules.

6. The system of claim 1, further comprising an array power receiver device configured to receive remote energy to charge said plurality of array power sources.

7. The system of claim 1, wherein said one or more drone apparatus further comprising a gas chamber affixed to said structure utilized to contain a less dense gas to counter a weight of said one or more drone apparatus.

8. The system of claim 1, wherein said one or more drone apparatus further comprising a signal antenna configured to transmit and receive inputs.

9. The system of claim 1, wherein said one or more drone apparatus further comprising a drone power receiver device configured to receive remote energy to charge said plurality of array power sources.

10. The system of claim 1, wherein said one or more drone apparatus further comprising a drone positioning system configured to receive and calculate one or more drone apparatus location.

11. The system of claim 1, wherein said one or more drone apparatus further comprising a drone command and control module to communicate with said array command and control module.

12. The system of claim 1, further comprising a deployment system to transport the maneuverable defense system to target location and altitude.

13. The system of claim 1, wherein said plurality of energy emitter modules, further comprise an RF source module and an RF amplifier to generate high powered pulsed RF energy beams to emanate from an emitter antenna.

14. The system of claim 1, wherein said plurality of energy emitter modules, further comprise an RF source module and an RF amplifier to generate destructive energy from an emitter antenna.

15. The system of claim 1, wherein said plurality of energy emitter modules, further comprise an RF source module and laser source module with an RF amplifier and an optical amplifier to generate destructive energy from an emitter point.

16. The system of claim 1, wherein said plurality of energy emitter modules, further comprise an RF source module and laser source module with an RF amplifier and a fiber amplifier to generate destructive energy from an emitter point.

17. The system of claim 1, wherein said plurality of energy emitter modules, further comprise an RF source module and an RF amplifier to generate destructive energy from a YAGI antenna.

18. The system of claim 1, further comprising a plurality of maneuverable defense systems.

19. The system of claim 6, further comprising a charging drone configured for wireless charging of said array power receiver device.

20. A maneuverable defense system to create a localized signal defeating or aircraft defeating zone deployable from a missile or aircraft at a target location/altitude in the upper atmosphere and beyond, said system comprising:

a deployable grid array having an interlaced web structure, said deployable grid array having a plurality of array power sources in electrical communication with a plurality of charging capacitors, said array power sources and said plurality of charging capacitors affixed to said grid array;

a plurality of energy emitter modules in electrical communication with said plurality of charging capacitors, and said plurality of energy emitter modules affixed to said grid array;

an array command and control module in electrical communication with said plurality of energy emitter modules, said array command and control module to coordinate and control firing of said plurality of energy emitter modules; and one or more deployable micro thrusters affixed to said grid array, said one or more micro thrusters utilized to maneuver said grid array, said one or more deployable micro thrusters in communication with said array command and control module to activate said one or more deployable micro thrusters upon deployment.

* * * * *